United States Patent
Thorstenson et al.

(10) Patent No.: US 10,088,872 B2
(45) Date of Patent: Oct. 2, 2018

(54) CAPACITIVE DETECTION OF SCREEN PROTECTOR REMOVAL IN MOBILE COMMUNICATION DEVICE

(71) Applicant: Motorola Mobility LLC, Chicago, IL (US)

(72) Inventors: Daniel S Thorstenson, Chicago, IL (US); James S Bender, Cary, IL (US); Dale Bengtson, Evanston, IL (US); Mark P Florczak, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 171 days.

(21) Appl. No.: 14/886,470

(22) Filed: Oct. 19, 2015

(65) Prior Publication Data

US 2017/0108961 A1   Apr. 20, 2017

(51) Int. Cl.
*G06F 1/16*   (2006.01)
(52) U.S. Cl.
CPC .......... *G06F 1/1656* (2013.01); *G06F 1/1626* (2013.01); *G06F 2200/1634* (2013.01)
(58) Field of Classification Search
CPC ........... G06F 1/1626; G06F 2200/1634; G06F 1/1656
See application file for complete search history.

(56) References Cited

U.S. PATENT DOCUMENTS

| | | | |
|---|---|---|---|
| 9,325,366 B1* | 4/2016 | Zhou | H04B 1/3888 |
| 2014/0335957 A1* | 11/2014 | Wikel | A63F 13/31 463/37 |
| 2015/0022375 A1* | 1/2015 | Lee | A61M 1/127 340/870.28 |
| 2015/0022481 A1* | 1/2015 | Andersson | G06F 3/044 345/174 |
| 2017/0029553 A1* | 2/2017 | Murakami | C08G 18/81 |

* cited by examiner

*Primary Examiner* — Charles Hicks
(74) *Attorney, Agent, or Firm* — Miller, Matthias & Hull LLP (57) ABSTRACT

Systems and methods for protecting a mobile device screen utilize a screen protector overlying the display screen lens, wherein the screen protector includes a conductive region. The device face includes a plurality of conductors underlying the screen protector at the conductive region. The conductors are capacitively coupled in the presence of the screen protector, and are capacitively decoupled when the screen protector is removed. This allows the device to detect removal of the screen protector and to perform a responsive action such as alerting a device user that the screen protector is not installed, instructing the user to install a screen protector, storing an indication that the screen protector is not installed and transmitting an indication that the screen protector is not installed.

20 Claims, 5 Drawing Sheets

CAPACITIVE DETECTION OF SCREEN PROTECTOR REMOVAL IN MOBILE COMMUNICATION DEVICE

TECHNICAL FIELD

The present disclosure is related generally to user interface protection technologies for mobile devices, and, more particularly, to a system and method for determining whether a screen protector has been removed from the device display screen.

BACKGROUND

Many portable communications devices, e.g., smart phones and the like, have traditionally utilized glass lenses over the device display. The glass provides a hard, scratch-resistant surface that is easy to clean and maintain. However, such lenses are also easily cracked if the device is dropped or struck by a hard object.

While it is possible to use plastic lenses to eliminate or reduce this type of breakage, there are a number of drawbacks associated with the use of plastic lenses. One of the primary challenges for this type of lens is the lack of adequate scratch and abrasion resistance. Plastic materials do not have the same hardness as glass and therefore do not offer the same abrasion and damage resistance.

Before proceeding, it should be appreciated that the present disclosure is directed to a system that can eliminate some of the shortcomings noted in this Background section. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art. Moreover, the identification herein of desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, glass lenses on portable communication devices are hard, resulting in scratch resistance, but brittle, resulting in breakage if the lens is struck.

While many users already make use of replaceable screen protectors over glass lenses to prevent breakage, these screen protectors are easily removed, leaving the lens vulnerable. Moreover, the easy application and removal of such protection measures prevents manufacturers from employing a plastic lens. In particular, if a manufacturer were to build a device with a plastic lens, the lens would be easily scratched in the event a protector is used or a protector is provided but is later removed by the user.

In an embodiment of the disclosed principles, a replaceable plastic screen protector is used in conjunction with a plastic lens, essentially eliminating lens breakage from drop events. In concert with this form of lens protection, a detection system is provided for determining whether the plastic lens has been exposed by removal of the screen protector.

To automatically detect if the screen protector is present, an additional capacitive sensor is employed outside of the active display area in an embodiment. In one implementation, a conductive (e.g., metallic) logo decoration is included as part of the screen protector, such that when the screen protector is assembled to device, the conductive logo is aligned between two sense contacts of the capacitive touch button. This causes coupling and essentially closes a circuit having the two sense contacts as end points.

The device is configured to monitor the circuit for an open condition, indicating either that the screen protector has been removed or that another unknown type of screen protector is being used. In either case, the user may be reminded to use an a screen protector and to make sure that the screen protector they use is approved by the device manufacturer.

In addition, a notification may be sent to the device manufacturer or the carrier for use as it relates to warranty tracking or internal data collection, e.g., for tracking refurbishment rates. The user may also be provided with links to replacement products or instructional information such as videos regarding installation of a screen protector. In an embodiment, the user is prompted to take a brief survey as to why the screen protector has been removed (e.g., poor visibility).

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

Figure 1:
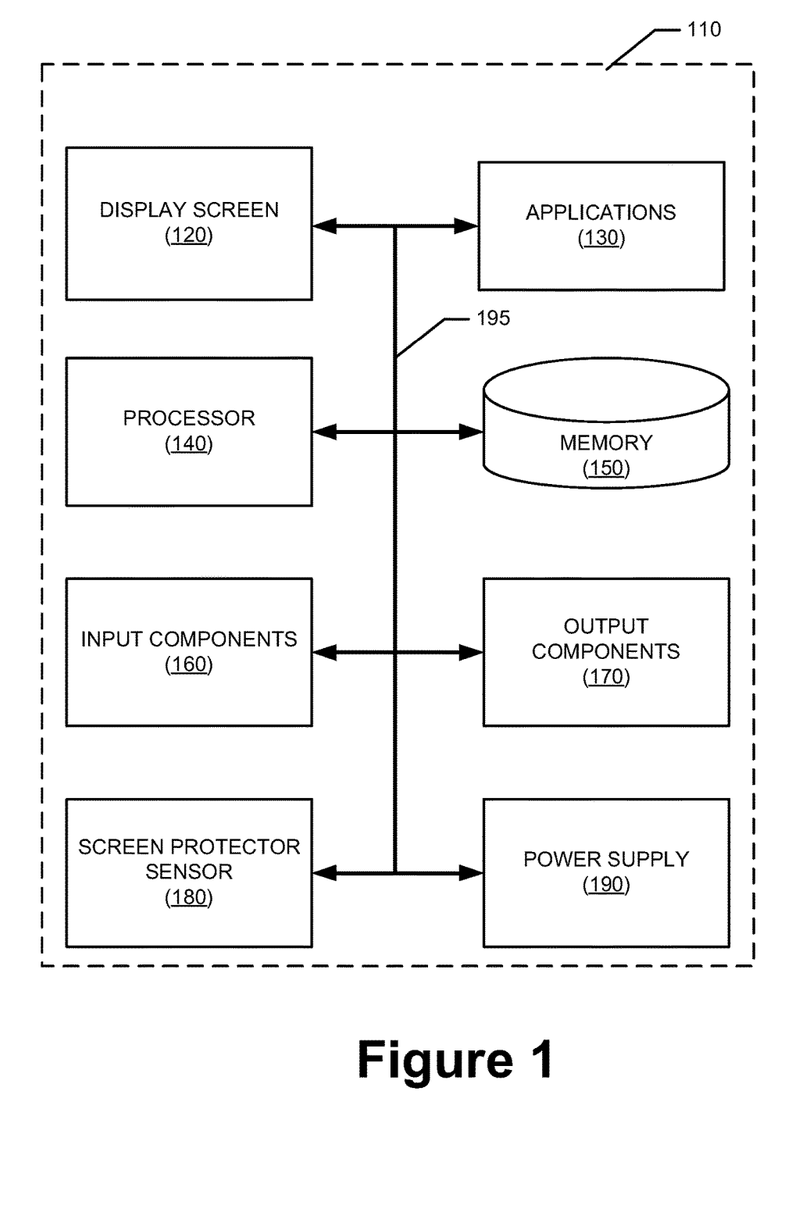
FIG. 1 is a simplified schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 further includes one or more screen protector sensors 180 configured to provide a signal indicative of the presence or absence of a screen protector on the device display screen 120. In an embodiment, as noted above, the screen protector sensors 180 include a capacitive sensor or other non-contact sensor.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
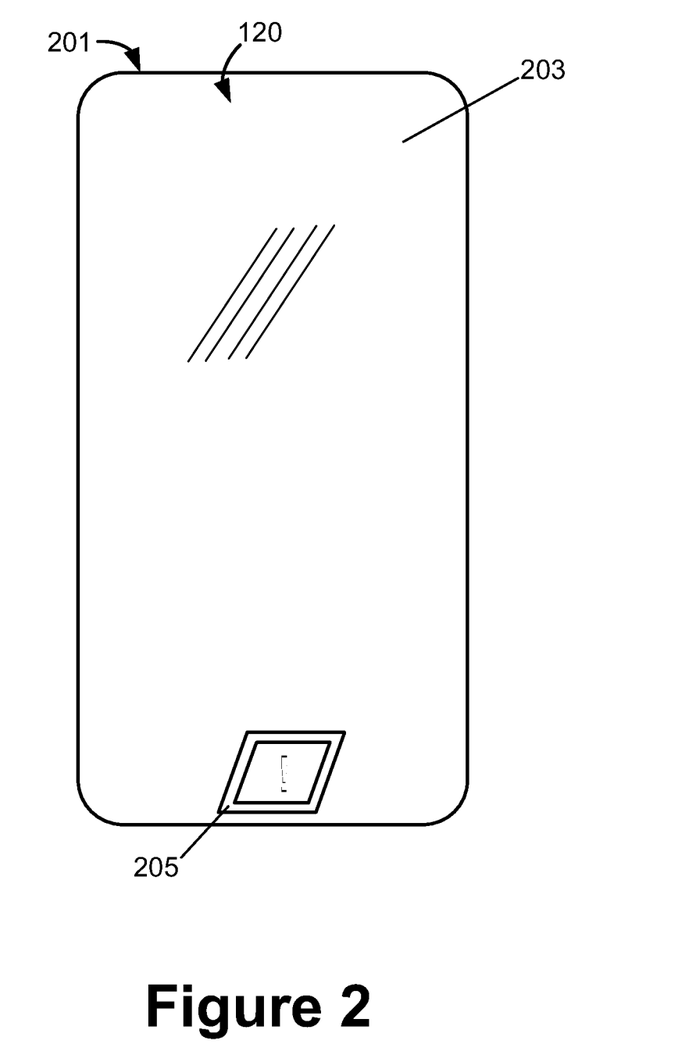
FIG. 2 is a front view of a device in accordance with an embodiment of the disclosed principles, showing the device screen and logo.

Turning to FIG. 2, this figure shows a front view of a device 201 in accordance with an embodiment of the disclosed principles. From the front, the appearance of the device 201 is dominated by the device display screen 120. As noted above, the screen may be made of, or comprise, plastic to avoid breakage. To protect the screen 120 from scratches and abrasion, a screen protector 203 is applied over the display screen 120 as in the illustrated embodiment. The screen protector 203 is substantially transparent, allowing the screen 120 to be viewed through the screen protector 203.

The screen protector 203 in the illustrated embodiment includes a conductive logo 205. The conductive logo 205 may be made of printed metallic ink, an adhesive metallic piece or other suitable design, and is substantially permanently joined to or into the screen protector 203. The precise shape and design of the logo 205 is not important. However, as will be appreciated from the following discussion, the logo 205 should be of sufficient extent to allow sensing by an underlying sensor mechanism.

Figure 3:
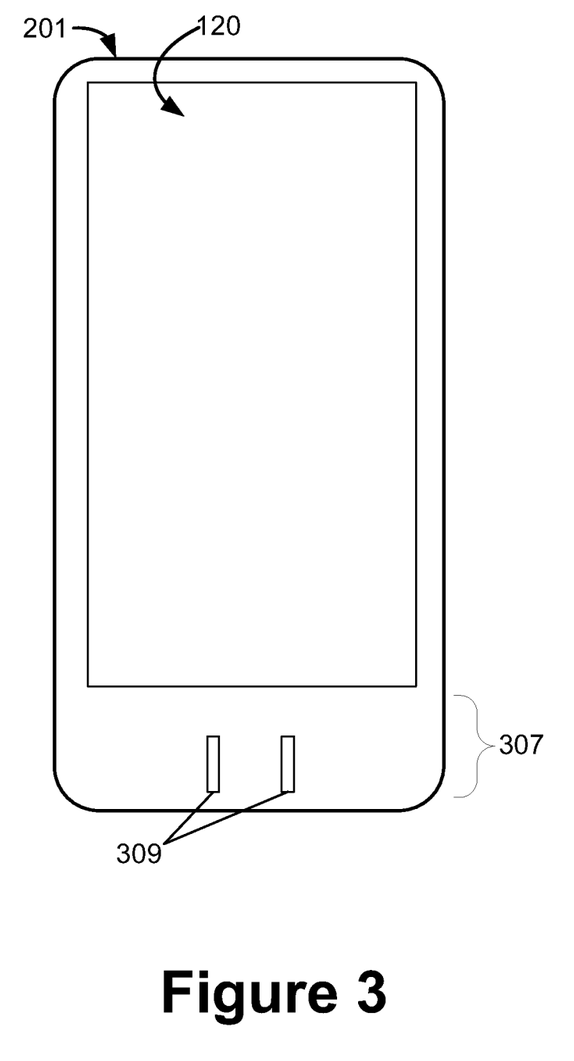
FIG. 3 is a simplified schematic of the face of a device in accordance with an embodiment of the disclosed principles including the device screen and conductive sense contacts.

Turning to FIG. 3, this figure illustrates the underlying elements on the face of the device 201 in greater detail, i.e., beneath the screen protector 203 and display lens. In particular, as can be seen, the active area of the screen 120 covers most but not all of the face of the device 201. A pair of sense contacts 309 is located in the remaining area 307 on the device 201 front. The location of the sense contacts 309 on the device 201 is such that when the screen protector 203 is installed on the screen 120, the conductive logo 205 overlies and bridges the sense contacts 309. In an embodiment, the sense contacts 309 are configured for capacitive rather than conductive sensing, and as such, the conductive logo 205 need not physically touch the sense contacts 309.

Figure 4:
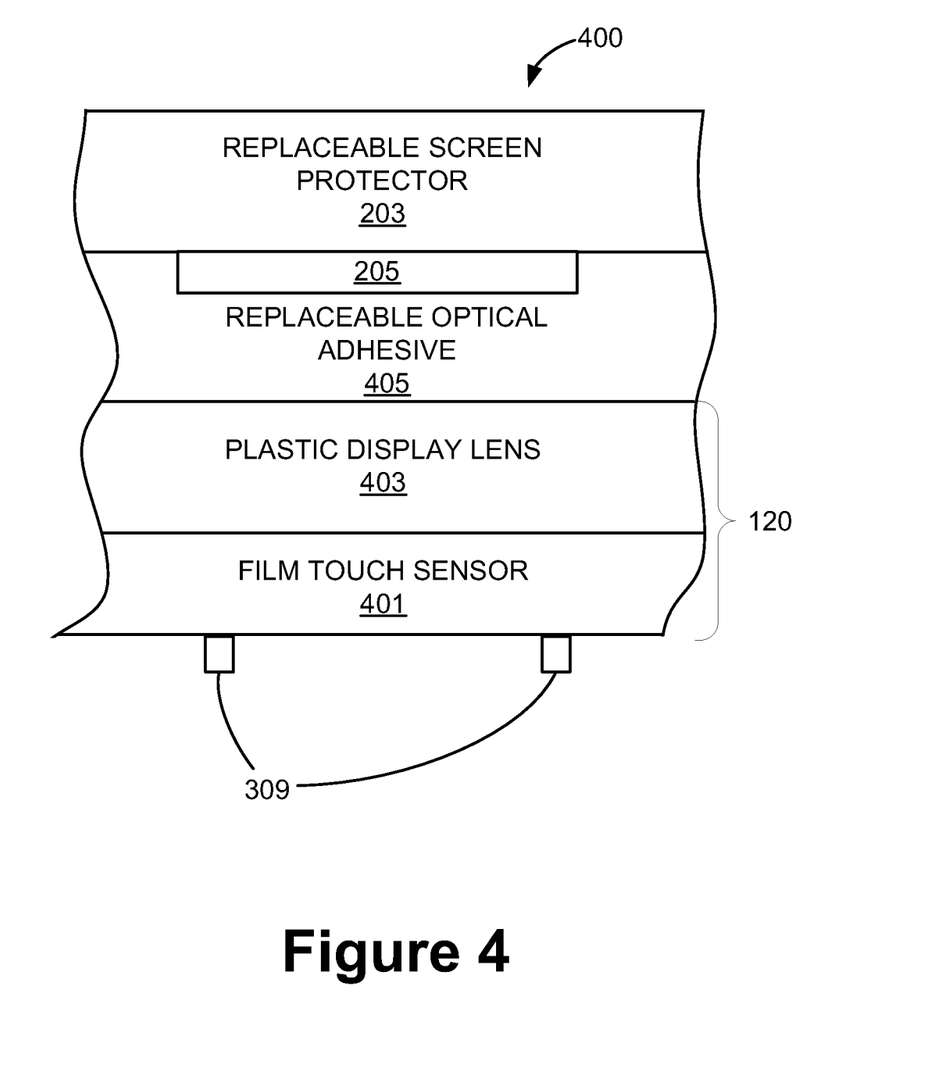
FIG. 4 is a cross-sectional layer diagram of a display screen assembly in accordance with an embodiment of the disclosed principles.

The relationship between the various lens and display components in a layered screen structure can be better seen in the partial cross-sectional view of FIG. 4. In particular, FIG. 4 shows a cross-section of a display screen assembly 400 in accordance with an embodiment of the disclosed principles. The illustrated cross-section is taken perpendicularly through the device screen region in a plane that cuts through each contact in the pair of sense contacts 309.

The display screen 120 is made up of a film touch sensor 401 covered by a plastic display lens 403. As noted above, while the plastic display lens 403 is more resistant to breakage than an equivalent glass lens, the plastic display lens 403 is more susceptible to scratching and abrasion. As such, a replaceable plastic screen protector such as plastic screen protector 203 is placed over the plastic display lens 403.

The conductive logo 205 in the illustrated embodiment is adhered to the underside of the plastic screen protector 203 by any suitable means, e.g., ultrasonic bonding, adhesives and so on. The plastic screen protector 203 as whole, bearing the conductive logo 205, is adhered to the top surface of the plastic display lens 403 via a suitable replaceable optical adhesive 405.

With this structure, the plastic screen protector 203 can be sensed at the pair of sense contacts 309 by capacitively sensing the associated conductive logo 205. In particular, the capacitance across the pair of sense contacts 309 is changed by the presence of the conductive logo 205 such that removal of the plastic screen protector 203, and with it the conductive logo 205, causes a detectable change in capacitance across the pair of sense contacts 309. The device is configured to monitor the circuit for an open condition, indicating either that the screen protector 203 has been removed or that another unknown screen protector is being used. In either case, the user may be reminded to use a screen protector and to make sure that the screen protector is approved by the device manufacturer.

In addition, a notification may be sent to the device manufacturer or the carrier for use as it relates to warranty tracking or internal data collection, e.g., for tracking refurbishment rates. The user may also be provided with links to replacement products or instructional information such as videos regarding installation of a screen protector. In an embodiment, the user is prompted to take a brief survey as to why the screen protector has been removed (e.g., poor visibility, inadequate touch sensing, etc.). In an alternative embodiment, the conductive logo 205 is made of a transparent conductive material such as ITO (Indium Tin Oxide).

Figure 5:
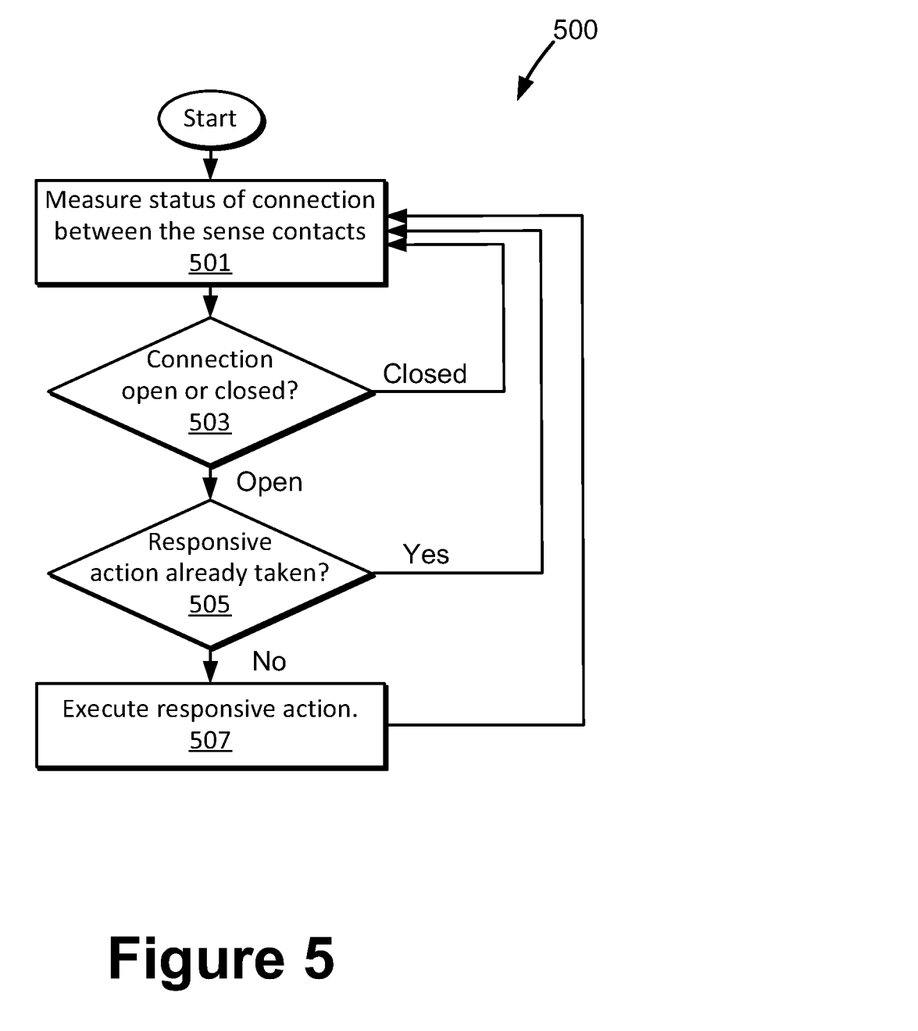
FIG. 5 is a flow chart illustrating a process of screen protector detection in accordance with an embodiment of the disclosed principles.

Turning to FIG. 5, this figure provides a flowchart of a process in accordance with an embodiment of the disclosed principles. In particular, the illustrated process 500 shows the detection of the presence and absence of the plastic screen protector 203 having a conductive patch such as a logo. Also, as noted above, the mobile communication device 110 (FIG. 1), 201 (FIGS. 2-3) comprises a processor 140 configured to run an operating system and one or more applications 130. It will be appreciated that the described process 500 is executed by the processor 140 as part of the operating system, an application, or other software. In an embodiment, in order to execute software, the processor 130 reads computer-executable instructions from a non-transitory computer-readable medium such as a local or remote memory 150.

At stage 501 of the process 500, the processor 130 causes a measurement or probe of the status of the connection between the sense contacts 309, and at stage 503 determines whether the connection is open or closed. It will be appreciated that in an embodiment wherein the conductive logo 205 is capacitively coupled with the sense contacts 309, the connection between the sense contacts 309 will always be open at DC but will act closed at higher AC frequencies when the conductive logo 205 is present.

The processor 130 determines at stage 503 whether the circuit acts open or closed to a predetermined AC frequency. If the circuit acts closed to this frequency then the conductive logo 205 is present, meaning that the screen protector 203 is present, and the process 500 accordingly returns to stage 501. Otherwise, e.g., if the circuit acts open to the selected frequency, then the process 500 moves to stage 505, wherein the processor 140 determines whether a responsive action has already been taken. If such an action has already been taken, the process 500 returns to stage 501.

If it is determined at stage 505 that a responsive action has not already been taken, then the processor 130 executes a responsive action at stage 507. The responsive action may be one that alerts the user, instructs the user or stores data for more general use, e.g., for data tracking and behavioral analysis. Thus for example, the responsive action may comprise presenting an alert on the device screen indicating to the user that a screen protector is not present and that the user should secure and apply a protector. The alert in this embodiment may include a link or directions usable to obtain an approved screen protector.

In an alternative embodiment, the responsive action includes opening a survey screen and soliciting information related to the use or non-use of a screen protector. In addition to or instead of the foregoing options, the device may store the time, date, duration or other data related to the absence of the screen protector in local or remote storage. This information may assist in evaluating warranty claims, product design and other tasks requiring product usage information. From stage 507, the process returns to stage 501.

It will be appreciated that various systems and processes for screen protector detection have been disclosed herein, along with methods and configurations for enabling the use of plastic display lenses in mobile devices. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
   a display screen having a film touch sensor and a lens;
   a transparent plastic screen protector overlying the display screen lens such that the film touch sensor senses touch through the transparent plastic screen protector, the transparent plastic screen protector also including a conductive region;
   a plurality of conductors located on the device beneath the conductive region such that the conductive region of the transparent plastic screen protector overlies two or more conductors; and
   a processor configured to detect that the transparent plastic screen protector has been removed from the display screen lens by determining that electrical coupling between the two or more conductors has decreased and to take a responsive action upon detecting that the transparent plastic screen protector has been removed from the display screen lens.

2. The portable electronic communication device in accordance with claim 1, wherein the display screen lens is made of plastic.

3. The portable electronic communication device in accordance with claim 1, wherein the transparent plastic screen protector is adhered to the display screen lens via an optical adhesive.

4. The portable electronic communication device in accordance with claim 1, wherein the conductive region comprises at least one of a metal and indium tin oxide.

5. The portable electronic communication device in accordance with claim 1, wherein the conductive region is located within the transparent plastic screen protector.

6. The portable electronic communication device in accordance with claim 1, wherein the conductive region is adhered to a surface of the transparent plastic screen protector.

7. The portable electronic communication device in accordance with claim 1, wherein the plurality of conductors are located beneath the film touch sensor.

8. The portable electronic communication device in accordance with claim 1, wherein the coupling between the two or more conductors in the presence of the conductive region is conductive.

9. The portable electronic communication device in accordance with claim 1, wherein the coupling between the two or more conductors in the presence of the conductive region is capacitive.

10. The portable electronic communication device in accordance with claim 1, wherein the responsive action includes alerting a user of the device to install a transparent plastic screen protector.

11. The portable electronic communication device in accordance with claim 1, wherein the responsive action includes storing an indication that the transparent plastic screen protector has been removed.

12. A portable electronic communication device screen protection system comprising:
   a plurality of conductors located on the device adjacent a display screen lens of the device; and
   a transparent screen protector configured to overlie both the display screen lens and the plurality of conductors and allowing user access to the display screen when the transparent screen protector is installed on the device, the transparent screen protector having a conductive region located to overlie the plurality of conductors when the transparent screen protector is in the installed position.

13. The portable electronic communication device screen protection system in accordance with claim 12, wherein the display screen lens is made of plastic.

14. The portable electronic communication device screen protection system in accordance with claim 12, wherein the transparent screen protector is installed on the display screen lens via an optical adhesive.

15. The portable electronic communication device screen protection system in accordance with claim 12, wherein the conductive region comprises at least one of a metal and indium tin oxide.

16. The portable electronic communication device screen protection system in accordance with claim 12, wherein the conductive region is located within the transparent screen protector.

17. The portable electronic communication device screen protection system in accordance with claim 12, wherein the conductive region is adhered to a surface of the transparent screen protector.

18. The portable electronic communication device screen protection system in accordance with claim 12, wherein the plurality of conductors are located beneath a film touch sensor of the display screen.

19. The portable electronic communication device screen protection system in accordance with claim 12, wherein the plurality of conductors couple either conductively or capacitively in the presence of the conductive region.

20. A method of detecting the presence of a transparent screen protector on a screen of a portable electronic communication device, the device including a pair of conductors on the device underlying a conductive region on the transparent screen protector, the method comprising:
   measuring conductivity between the pair of conductors;
   determining whether the conductors are capacitively coupled; and
   executing a responsive action upon determining that the conductors are not capacitively coupled, the responsive action being at least one of alerting a device user that the transparent screen protector is not installed, instructing the user to install a transparent screen protector, storing an indication that the transparent screen protector is not installed and transmitting an indication that the transparent screen protector is not installed.

* * * * *

UNITED STATES PATENT AND TRADEMARK OFFICE
CERTIFICATE OF CORRECTION

PATENT NO. : 10,088,872 B2
APPLICATION NO. : 14/886470
DATED : October 2, 2018
INVENTOR(S) : Daniel S Thorstenson et al.

Page 1 of 1

It is certified that error appears in the above-identified patent and that said Letters Patent is hereby corrected as shown below:

On the Title Page

Item (72) the second inventor should read:
"James E Bender"

Signed and Sealed this
Eighteenth Day of December, 2018

Andrei Iancu
*Director of the United States Patent and Trademark Office*